(12) United States Patent
Chen et al.

(10) Patent No.: US 8,730,992 B2
(45) Date of Patent: May 20, 2014

(54) SYSTEM AND METHOD FOR TRANSMITTING NETWORK PACKETS ADAPTED FOR MULTIMEDIA STREAMS

(75) Inventors: Chi-Chun Chen, Hsinchu (TW);
Lung-Chih Kuo, Tainan County (TW);
Zhong-Zhen Wu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 401 days.

(21) Appl. No.: 12/719,020

(22) Filed: Mar. 8, 2010

(65) Prior Publication Data
US 2011/0149967 A1   Jun. 23, 2011

(30) Foreign Application Priority Data

Dec. 22, 2009  (TW) .............................. 98144305 A (51) Int. Cl.
*H04L 12/43* (2006.01)
*H04L 12/28* (2006.01)

(52) U.S. Cl.
USPC ........................ 370/458; 370/230; 370/395.4

(58) Field of Classification Search
None
See application file for complete search history.

(56) References Cited

U.S. PATENT DOCUMENTS

| | | | | |
|---|---|---|---|---|
| 4,635,098 A | * | 1/1987 | Thong | 348/489 |
| 5,487,066 A | * | 1/1996 | McNamara et al. | 370/436 |
| 5,541,921 A | * | 7/1996 | Swenson et al. | 370/376 |
| 5,991,842 A | * | 11/1999 | Takayama | 710/105 |
| 6,034,732 A | * | 3/2000 | Hirota et al. | 348/441 |
| 6,041,359 A | * | 3/2000 | Birdwell | 709/238 |
| 6,119,243 A | * | 9/2000 | Garney et al. | 713/600 |
| 6,144,411 A | * | 11/2000 | Kobayashi et al. | 348/441 |
| 6,157,836 A | * | 12/2000 | Cashman | 455/436 |
| 6,282,182 B1 | * | 8/2001 | Pecen et al. | 370/336 |
| 6,438,630 B1 | * | 8/2002 | DeMoney | 710/56 |
| 6,717,961 B1 | * | 4/2004 | Park | 370/538 |
| 6,806,975 B1 | * | 10/2004 | Fujita et al. | 358/1.14 |
| 6,895,003 B1 | * | 5/2005 | Kobayashi et al. | 370/389 |
| 6,986,007 B1 | * | 1/2006 | Procyk et al. | 711/154 |
| 7,454,539 B2 | * | 11/2008 | Lee et al. | 710/58 |
| 7,633,925 B2 | * | 12/2009 | Iwamura | 370/345 |

(Continued)

FOREIGN PATENT DOCUMENTS

EP   1102171 A2 *  5/2001 ............. G06F 13/38

OTHER PUBLICATIONS

Cho et al., "A Novel Architecture of Home Gateway for Efficient Packet Process," Proceedings of the IEEE Workshop on Knowledge Media Networking, Jul. 10-12, 2002, pp. 1-5.

*Primary Examiner* — Marsha D Banks Harold
*Assistant Examiner* — Christopher Wyllie
(74) *Attorney, Agent, or Firm* — Jianq Chyun IP Office (57) ABSTRACT

A system and a method for transmitting network packets are provided. The system includes an information module, a scheduling module, and a forwarding module. The information module receives and records media information of a plurality of multimedia streams. The scheduling module calculates a guaranteed bit rate of each multimedia stream according to the media information provided by the information module, and rearranges isochronous packets of the multimedia streams in the first time slots of a plurality of clock cycles according to the guaranteed bit rates so that the transmission of the isochronous packets satisfies the guaranteed bit rates. The length of each clock cycle is a predetermined length. The length of the first time slot and the predetermined length are in a predetermined ratio. The forwarding module transmits all the packets of a clock cycle to a network at every a time interval of the predetermined length.

22 Claims, 8 Drawing Sheets

(56) References Cited

U.S. PATENT DOCUMENTS

| | | | |
|---|---|---|---|
| 7,940,809 B2 * | 5/2011 | Lee | 370/525 |
| 8,028,040 B1 * | 9/2011 | Hobbs et al. | 709/219 |
| 8,369,958 B2 * | 2/2013 | Kwon et al. | 607/57 |
| 2003/0093810 A1 * | 5/2003 | Taniguchi | 725/112 |
| 2003/0196040 A1 * | 10/2003 | Hosogi et al. | 711/128 |
| 2004/0063399 A1 * | 4/2004 | Milbar | 455/3.01 |
| 2004/0114607 A1 * | 6/2004 | Shay et al. | 370/395.42 |
| 2004/0117735 A1 * | 6/2004 | Breen | 715/517 |
| 2004/0151143 A1 * | 8/2004 | Abdesselem et al. | 370/336 |
| 2005/0018615 A1 * | 1/2005 | Itoh et al. | 370/252 |
| 2005/0080904 A1 * | 4/2005 | Green | 709/227 |
| 2005/0094665 A1 * | 5/2005 | Nalawadi et al. | 370/468 |
| 2006/0007958 A1 * | 1/2006 | Kang et al. | 370/476 |
| 2006/0018334 A1 * | 1/2006 | Cho et al. | 370/432 |
| 2006/0018381 A1 * | 1/2006 | Luo et al. | 375/240.16 |
| 2006/0153080 A1 | 7/2006 | Palm | |
| 2006/0203826 A1 | 9/2006 | Cho et al. | |
| 2006/0239303 A1 | 10/2006 | Cho et al. | |
| 2006/0242315 A1 | 10/2006 | Nichols | |
| 2006/0245379 A1 * | 11/2006 | Abuan et al. | 370/261 |
| 2006/0277581 A1 * | 12/2006 | Eliyahu et al. | 725/88 |
| 2007/0008993 A1 * | 1/2007 | Cha et al. | 370/509 |
| 2007/0014279 A1 * | 1/2007 | Wang et al. | 370/351 |
| 2007/0025385 A1 | 2/2007 | Cho et al. | |
| 2007/0121678 A1 * | 5/2007 | Brooks et al. | 370/505 |
| 2007/0129052 A1 * | 6/2007 | Jabri et al. | 455/403 |
| 2007/0153697 A1 * | 7/2007 | Kwan et al. | 370/235 |
| 2007/0174478 A1 * | 7/2007 | Ryu et al. | 709/231 |
| 2007/0223470 A1 | 9/2007 | Stahl | |
| 2007/0250635 A1 | 10/2007 | Hamilton et al. | |
| 2007/0280223 A1 | 12/2007 | Pan et al. | |
| 2008/0037567 A1 | 2/2008 | Cho et al. | |
| 2008/0056192 A1 * | 3/2008 | Strong et al. | 370/331 |
| 2008/0198877 A1 * | 8/2008 | Radulescu et al. | 370/509 |
| 2009/0040929 A1 | 2/2009 | Lee et al. | |
| 2009/0103448 A1 * | 4/2009 | Waggener et al. | 370/253 |
| 2009/0219932 A1 | 9/2009 | Kobayashi | 370/389 |
| 2010/0040151 A1 * | 2/2010 | Garrett | 375/240.25 |
| 2010/0080292 A1 * | 4/2010 | Coulombe | 375/240.12 |
| 2011/0002429 A1 * | 1/2011 | Williams et al. | 375/356 |
| 2011/0050851 A1 * | 3/2011 | Chen et al. | 348/43 |
| 2011/0149795 A1 * | 6/2011 | Tanaka et al. | 370/253 |
| 2011/0205332 A1 * | 8/2011 | Jeong et al. | 348/14.08 |
| 2011/0216727 A1 * | 9/2011 | Chitrapu et al. | 370/329 |

* cited by examiner

SYSTEM AND METHOD FOR TRANSMITTING NETWORK PACKETS ADAPTED FOR MULTIMEDIA STREAMS

CROSS-REFERENCE TO RELATED APPLICATION

This application claims the priority benefit of Taiwan application serial no. 98144305, filed on Dec. 22, 2009. The entirety of the above-mentioned patent application is hereby incorporated by reference herein and made a part of specification.

BACKGROUND

1. Technical Field

The present disclosure relates to a system and a method for transmitting network packets adapted for transmitting isochronous packets of multimedia streams.

2. Description of Related Art

With development of digital home appliances, applications of enjoying high quality real-time video services through a network are greatly increased. For example, a residential Ethernet is used to connect every room in the home, and multimedia data in a digital versatile disc (DVD) player located in a bedroom can be viewed via a television located in a living room in real-time through network streaming. The conventional Ethernet applies a carrier sense multiple access communication protocol with collision detection (CSMA/CD) to compete with each other for the same bandwidth to transmit packets. Such mechanism is not suitable for transmitting time-sensitive packets such as video and audio files since a transmitting time is liable to be delayed to decrease a quality of service (QoS). Therefore, under an environment of limited bandwidth and in case that file transmission trends to be more complicated, to effectively adjust the bandwidth to increase a system performance is an important issue.

An institute of electrical and electronics engineers (IEEE) 802.1 p/q is a standard established for resolving the transmission QoS issue, in which a tag of 4 bytes is added in a header of layer 2. The front two bytes are fixed to be 8100H, which serve as an identification of an Ethernet packet type. The first 3 bits of the next 2 bytes are used for storing priorities. A transmission packet can be classified into 8 priorities, and the higher priority denotes a higher sending priority. If the priorities of isochronous packets of a video/audio file are increased, the transmission delay of the conventional Ethernet due to that all of the packets have the same priority can be ameliorated.

A U.S. Patent application No. US2007/0025385 provides a concept of time slot to monitor an applicable bandwidth of the network, and a counter is used to count a time interval for transmitting the isochronous packets. When the applicable bandwidth is relatively great, a relatively fast bit rate is used to transmit the isochronous packets, and when the applicable bandwidth is relatively small, a relatively slow bit rate is used to transmit the isochronous packets.

SUMMARY

In one exemplary embodiment, the present disclosure is directed to a system and a method for transmitting network packets, in which a plenty of multimedia streams can be accommodated in a limited bandwidth, so as to achieve a better usage rate of the network bandwidth to guarantee a quality of service (QoS).

In one exemplary embodiment, the present disclosure provides a system for transmitting network packets. The system includes an information module, a scheduling module, and a forwarding module. The information module receives and records media information of a plurality of multimedia streams. The scheduling module calculates a guaranteed bit rate of each of the multimedia streams according to the media information provided by the information module, and rearranges isochronous packets of the multimedia streams in first time slots of a plurality of clock cycles according to the guaranteed bit rates, so that the transmission of the isochronous packets satisfies the guaranteed bit rates. A length of each clock cycle is a predetermined length, and a length of the first time slot and the predetermined length are in a predetermined ratio. The forwarding module transmits all the packets of one of the clock cycles to a network at every a time interval of the predetermined length.

In one exemplary embodiment, the present disclosure provides a method for transmitting network packets. The method is performed by a media server and can be described as follows. First, media information of a plurality of multimedia streams provided by the media server is received and recorded. A guaranteed bit rate of each of the multimedia streams is calculated according to the media information. Isochronous packets of the multimedia streams are rearranged in first time slots of a plurality of clock cycles according to the guaranteed bit rates, so that the transmission of the isochronous packets satisfies the guaranteed bit rates. Then, all the packets of one of the clock cycles are transmitted to a network at every a time interval of a predetermined length.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
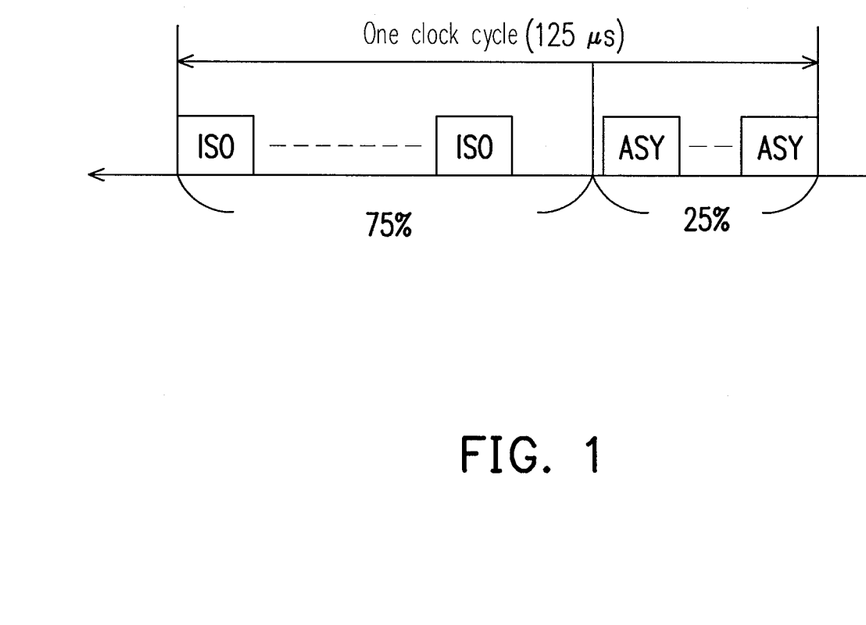
FIG. 1 is a schematic diagram illustrating a method for transmitting packets according to an embodiment of the present disclosure.

FIG. 1 is a schematic diagram illustrating a method for transmitting packets according to an embodiment of the present disclosure. The method may be performed by a media server connected to a network, such as a residential Ethernet. The present embodiment is based on the IEEE 802.1 audio video bridging (AVB) standard, wherein a clock cycle of 125 microseconds (μs) is adopted as the basic unit for packet transmission. As shown in FIG. 1, the clock cycle of 125 μs is divided into two time slots, wherein the front ¾ is the first time slot, and the rear ¼ is the second time slot. The first time slot is used for transmitting isochronous packets, which are indicated as "ISO" in FIG. 1, and the second time slot is used for transmitting asynchronous packets, which are indicated as "ASY" in FIG. 1.

The present disclosure is not limited to the embodiment of FIG. 1, and in the other embodiments, a length of the clock cycle can be adjusted, and a ratio between the first time slot and the second time slot can also be adjusted.

Figure 2:
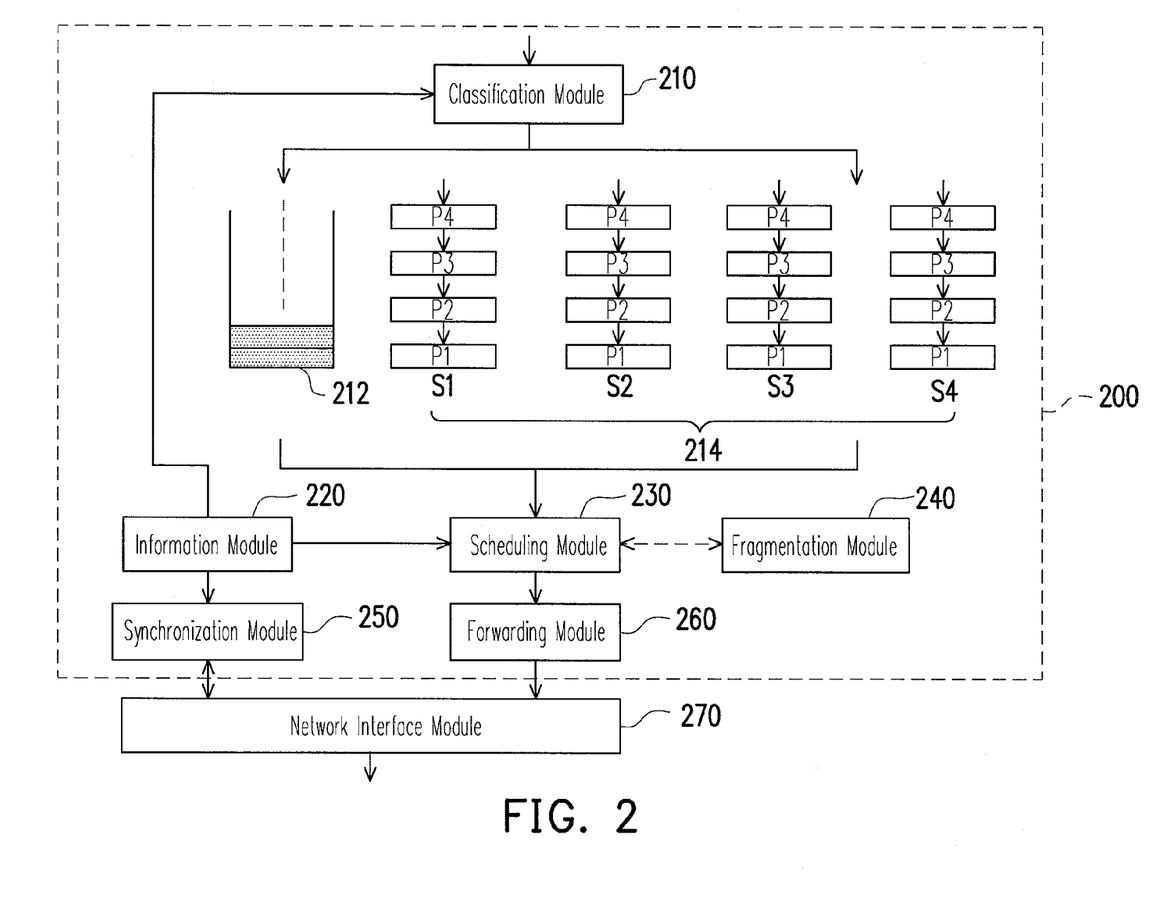
FIG. 2 is a schematic diagram illustrating a system for transmitting network packets according to an embodiment of the present disclosure.

FIG. 2 is a schematic diagram illustrating a system 200 for transmitting network packets according to an embodiment of the present disclosure. The system 200 for transmitting network packets may be a part of the aforementioned media server, which can be used in a residential Ethernet for providing multimedia streams to various video audio players. The system 200 for transmitting network packets can be implemented by hardware or software.

The system 200 for transmitting network packets includes a classification module 210, an information module 220, a scheduling module 230, a fragmentation module 240, a synchronization module 250, and a forwarding module 260. A network interface module 270 is an interface between the system 200 for transmitting network packets and a network. The classification module 210 stores an asynchronous queue 212 and a plurality of isochronous queues 214, wherein each of the isochronous queues 214 corresponds to one of four multimedia streams S1-S4 provided by the media server. Although four isochronous queues 214 and four multimedia streams S1-S4 are illustrated in FIG. 2, the present disclosure is not limited to the number of four. The isochronous queues 214 of FIG. 2 are all linked lists, though the present disclosure is not limited to the queue of the linked list type.

Figure 4:
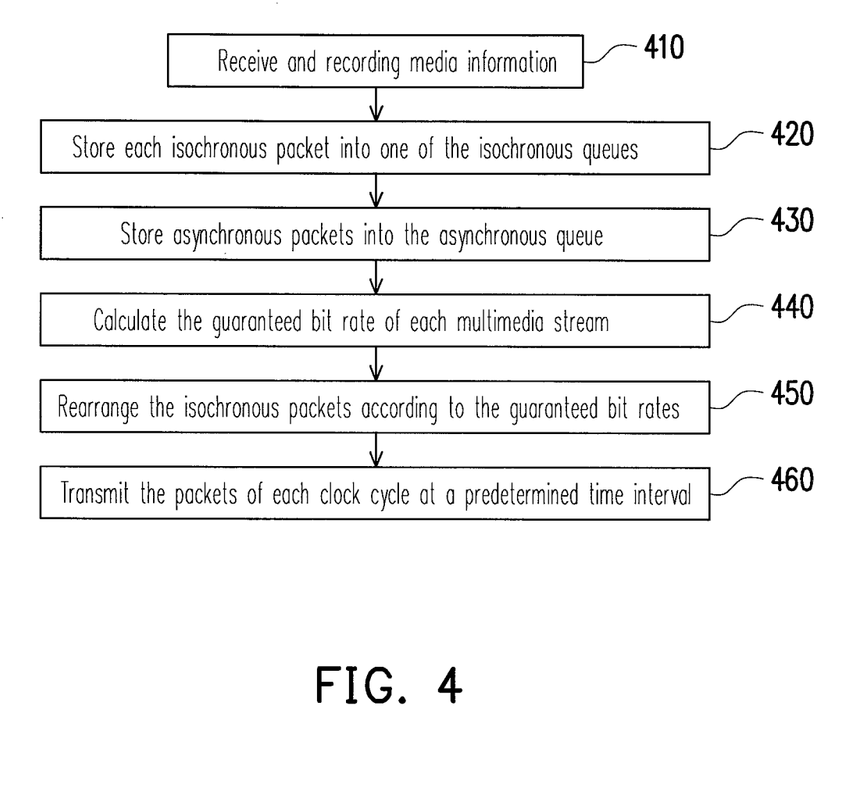
FIG. 4 is a flowchart illustrating a method for transmitting network packets according to an embodiment of the present disclosure.

FIG. 4 is a flowchart illustrating a method for transmitting network packets according to an embodiment of the present disclosure. The method is performed by the aforementioned media server. First, the information module 220 receives and records media information of the multimedia streams S1-S4 from an application layer of the media server (step 410). The media information may include information such as the session ID, the frame rate and the frame size, etc., of each of the multimedia streams S1-S4.

Then, the classification module 210 receives packets from the application layer, and classifies a type of the received packet, and stores each isochronous packet of the received multimedia streams S1-S4 into a corresponding one of the isochronous queues 214 according to the media information provided by the information module 220 (step 420), and further stores received asynchronous packets into the asynchronous queue 212 (step 430). In the present embodiment, each of the isochronous packets includes the session ID of the corresponding multimedia stream. The classification module 210 receives the media information provided by the information module 220, and allocates four corresponding isochronous queues 214 according to the session IDs in the media information of the multimedia streams S1-S4. The classification module 210 further compares the session IDs of the isochronous packets with the session IDs of the multimedia streams S1-S4, so as to store each isochronous packet into the corresponding isochronous queue 214 of the corresponding multimedia stream.

Figure 3:
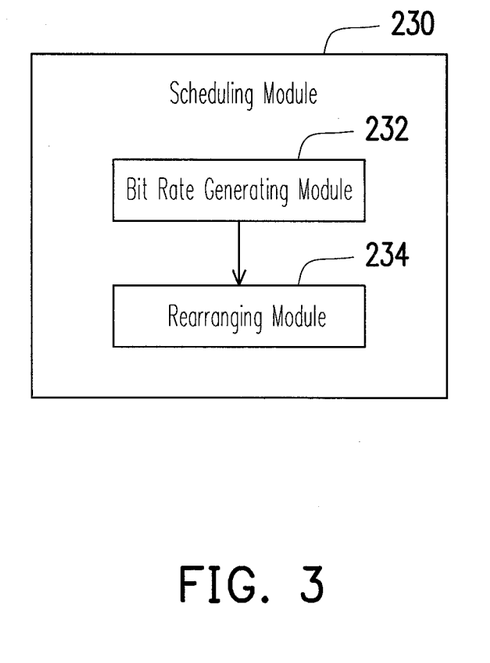
FIG. 3 is a block diagram illustrating a scheduling module of FIG. 2.

FIG. 3 is a block diagram illustrating the scheduling module 230. The scheduling module 230 includes a bit rate generating module 232 and a rearranging module 234. The bit rate generating module 232 calculates a guaranteed bit rate of each of the multimedia streams S1-S4 according to the media information provided by the information module 220 (step 440). The rearranging module 234 rearranges the isochronous packets of the multimedia streams S1-S4 into the first time slots of a plurality of clock cycles according to the guaranteed bit rates, so that the transmission of the isochronous packets satisfies the guaranteed bit rates (step 450). The bit rate generating module 232 can calculate the guaranteed bit rates of the multimedia streams S1-S4 according to the frame rates and the frame sizes in the media information of the multimedia streams S1-S4, and then the rearranging module 234 determines a transmitting sequence of the isochronous packets in each clock cycle according to the guaranteed bit rates.

Figure 5:
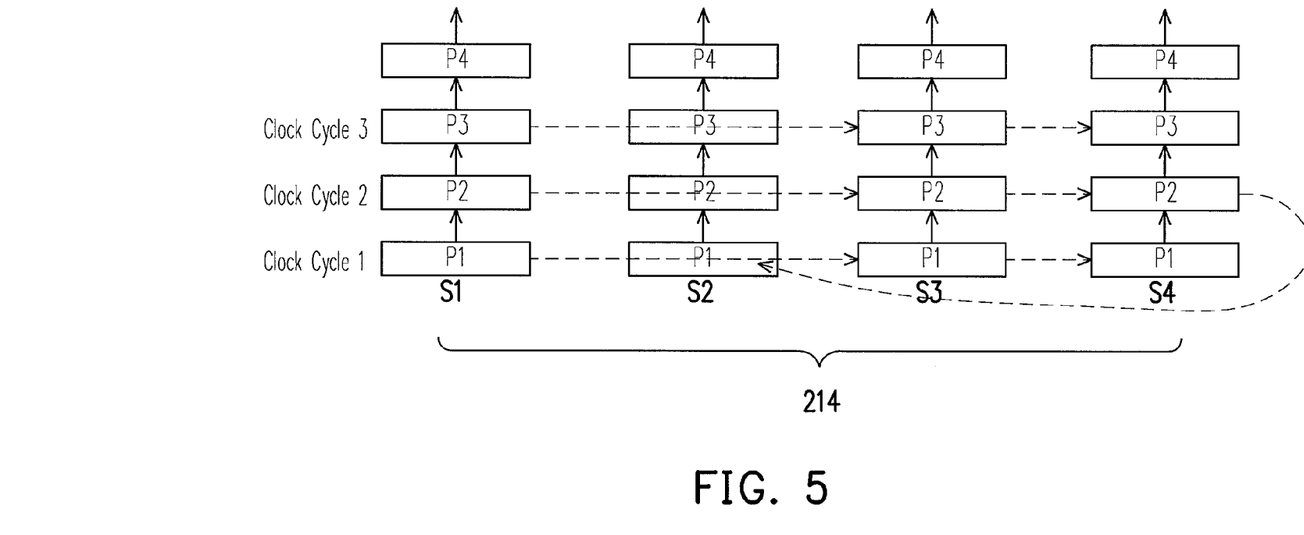
FIG. 5 is a schematic diagram of packet rearrangement according to an embodiment of the present disclosure.

For example, the rearranging module 234 may arrange enough isochronous packets to satisfy the guaranteed bit rates in the first time slot of each clock cycle according to the guaranteed bit rates of the multimedia streams S1-S4. As shown in FIG. 5, assuming a size of each of the isochronous packets P1-P4 is X bytes, the guaranteed bit rate required by each of the multimedia streams S1, S3 and S4 is X bytes per clock cycle, and the guaranteed bit rate required by the multimedia stream S2 is X/2 bytes per clock cycle. In the example of FIG. 5, the rearranging module 234 uses a linked list to link the isochronous packets arranged in each of the clock cycles according to a transmitting sequence. Since the guaranteed bit rate required by each of the multimedia streams S1, S3 and S4 is X bytes per clock cycle, the rearranging module 234 arranges one isochronous packet of the multimedia stream S1, one isochronous packet of the multimedia stream S3, and one isochronous packet of the multimedia stream S4 in each clock cycle. Since the guaranteed bit rate required by the multimedia stream S2 is X/2 bytes per clock cycle, the rearranging module 234 arranges one isochronous packet of the multimedia stream S2 in every two clock cycles. As shown in FIG. 5, in the first clock cycle, the first isochronous packets P1 of the multimedia streams S1, S3 and S4 are transmitted. In the second clock cycle, the second isochronous packets P2 of the multimedia streams S1, S3 and S4 and the first isochronous packet P1 of the multimedia streams S2 are transmitted. In the third clock cycle, the third isochronous packets P3 of the multimedia streams S1, S3 and S4 are transmitted.

If a guaranteed bit rate required by a certain multimedia stream is 2X bytes per clock cycle, the rearranging module 234 arranges two isochronous packets of such multimedia stream in each clock cycle, so as to guarantee the guaranteed bit rate.

Figure 6:
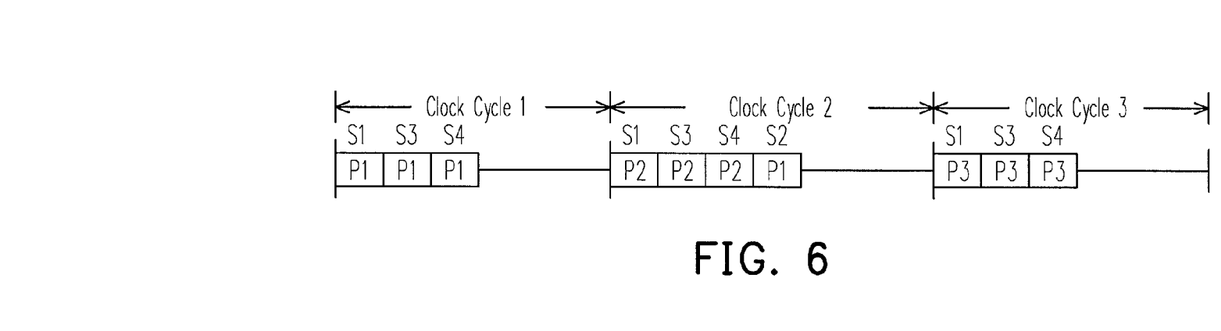
FIG. 6 is a packet transmitting timing diagram corresponding to FIG. 5.

Next, the forwarding module 260 transmits all of the packets of a current clock cycle to the network at every a time interval of the clock cycle according to the transmitting sequence arranged by the rearranging module 234, as that shown in FIG. 6 (step 460). The forwarding module 260 uses the first time slot to transmit the isochronous packets of each clock cycle, and uses the second time slot to transmit the asynchronous packets in the asynchronous queue 212. The asynchronous packets are not rearranged, and are directly transmitted according to a sequence of entering the asynchronous queue 212. When there is no isochronous packet to be transmitted at a clock cycle, or when transmission of the isochronous packets of such clock cycle has been completed before the first time slot ends, the forwarding module 260 is switched immediately to transmit the asynchronous packets in the asynchronous queue 212, so as to improve a usage rate of the bandwidth.

If there is a plurality of the same systems for transmitting network packets in a local network, the synchronization module 250 can ensure that these systems for transmitting network packets do not affect the transmission quality of service (QoS) to each other. The synchronization modules 250 of the systems for transmitting network packets can mutually exchange the respective media information, i.e. synchronize the media information of all of the multimedia streams in the whole network. In this case, the scheduling module 230 does not rearrange the isochronous packets only according to the media information of the multimedia streams provided by the media server to which the scheduling module 230 belongs, but rearranges the isochronous packets in the first time slots of each clock cycle according to the media information of all of the multimedia streams in the whole network.

Figure 7:
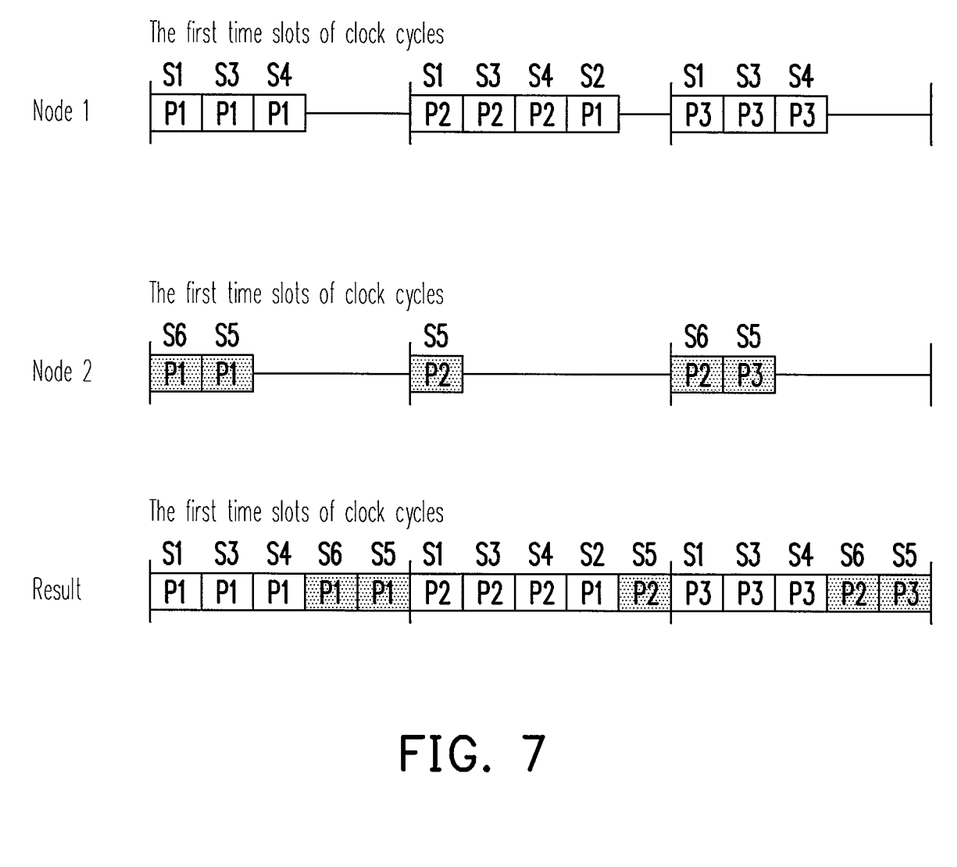
FIG. 7 is a packet transmitting timing diagram in case of synchronous media information according to an embodiment of the present disclosure.

FIG. 7 illustrates a synchronization example of the present embodiment. Wherein, a node 1 and a node 2 are two media servers in the local network, which respectively include a system 200 for transmitting network packets shown in FIG. 2. The node 1 provides four multimedia streams S1-S4, and the node 2 provides two multimedia streams S5 and S6. The synchronization modules 250 of the node 1 and the node 2 can mutually exchange the media information, so that the scheduling modules 230 of the node 1 and the node 2 can rearrange the respective isochronous packets according to the media information of all of the multimedia streams S1-S6. Shown as a result of FIG. 7, the scheduling modules 230 of the node 1 and the node 2 can cooperate with each other. During the odd clock cycle, the node 1 only transmits three isochronous packets, and the node 2 transmits two isochronous packets. During the even clock cycle, the node 1 transmits four isochronous packets, and the node 2 transmits only one isochronous packet. In this way, a mutual influence of the transmission QoS in the limited bandwidth can be avoided. Otherwise, if the scheduling modules 230 of the node 1 and the node 2 do not cooperate with each other, the node 2 probably transmits one isochronous packet during the odd clock cycle, and transmits two isochronous packets during the even clock cycle, which may lead to a waste of the network bandwidth during the odd clock cycle, and insufficient network bandwidth during the even clock cycle.

Figure 8:
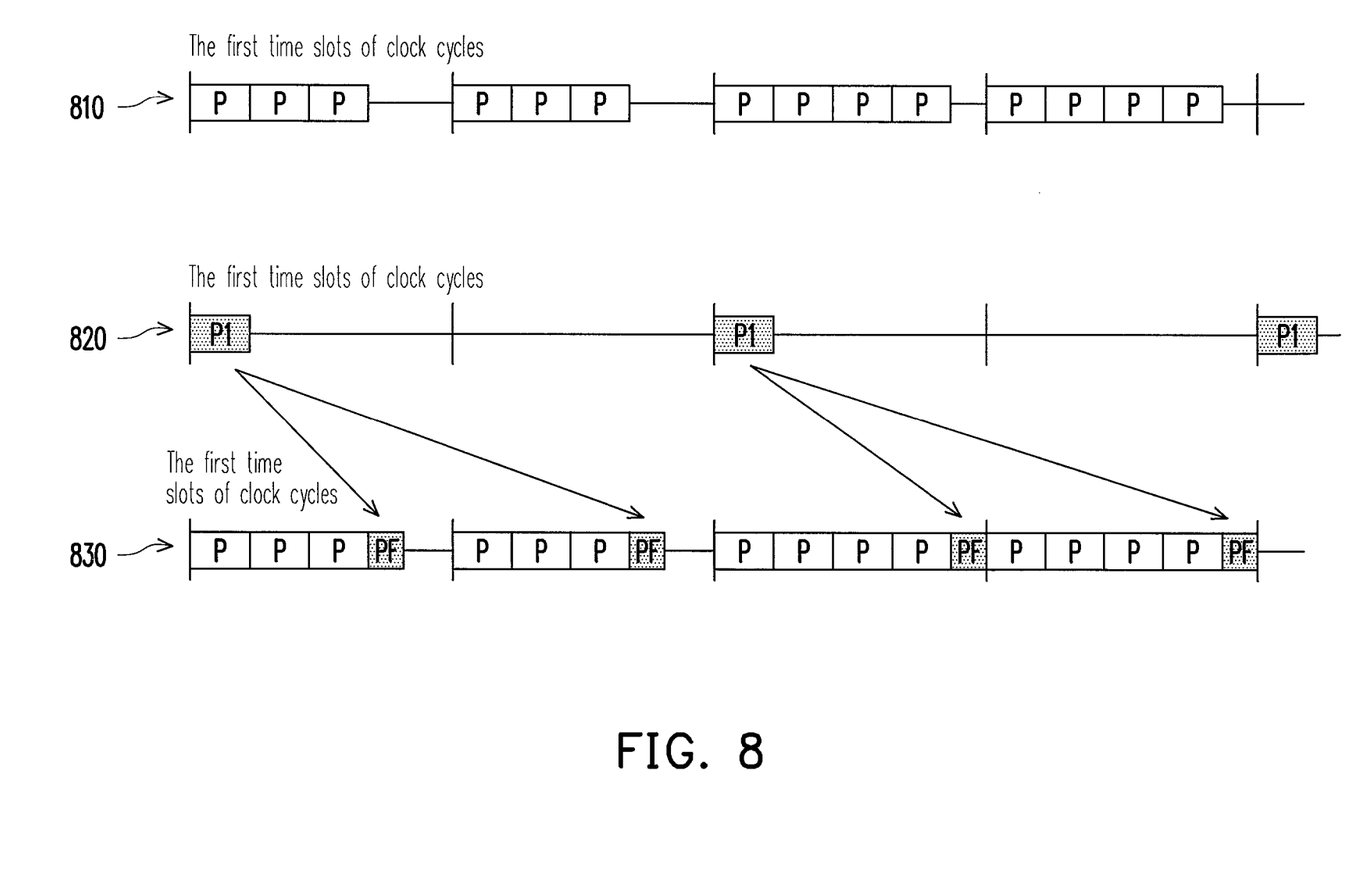
FIGS. 8 and 9 are packet transmitting timing diagrams in case that a packet fragmentation mechanism is activated according to an embodiment of the present disclosure.

According to a fragmentation mechanism of the fragmentation module 240, a remaining bandwidth of each clock cycle can be used to transmit more packets. The fragmentation mechanism of the isochronous packets is shown as FIG. 8. The scheduling module 230 already arranges a packet transmitting timing shown as 810, and meanwhile an isochronous packet P1 of another multimedia stream is still waiting to be transmitted (shown as a transmitting timing 820). Now, the remaining bandwidth of the first time slot is insufficient to transmit the isochronous packet P1, especially during the third and the fourth clock cycles. In this case, the scheduling module 230 activates the fragmentation module 240, and the fragmentation module 240 divides the isochronous packet P1 into a plurality of small packets PF according to the remaining bandwidth of the first time slots of the current clock cycle and follow-up clock cycles. Then, the scheduling module 230 arranges the small packets PF into the remaining bandwidth of the first time slots of the current clock cycle and the follow-up clock cycles, as that shown in a transmitting timing 830. In this way, transmission of the isochronous packet P1 can satisfy the guaranteed bit rate required by its multimedia stream, and meanwhile the usage rate of the network bandwidth is increased.

Figure 9:
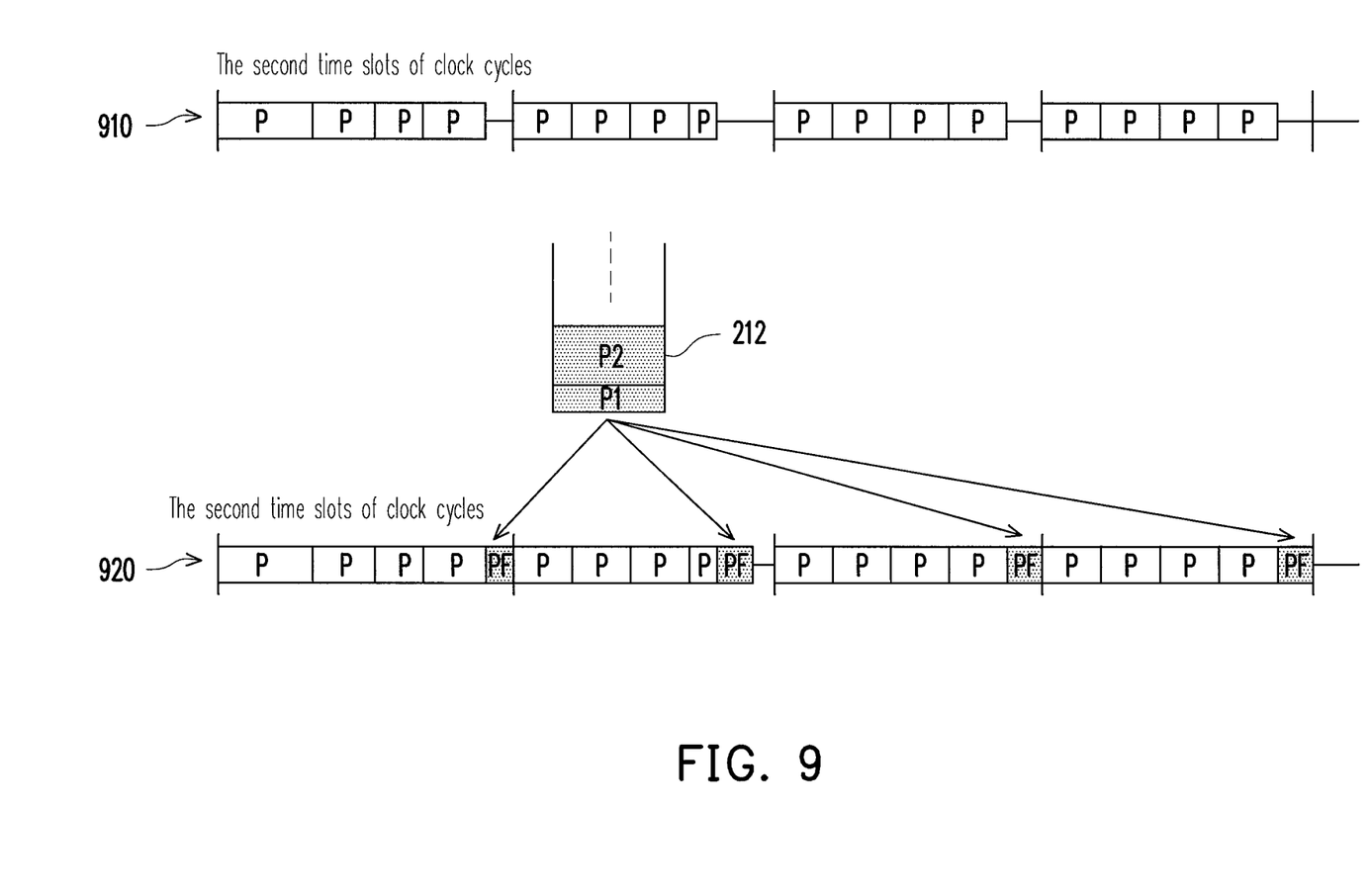

A fragmentation mechanism of the asynchronous packets is shown as FIG. 9. The scheduling module 230 uses the second time slot of the clock cycle to transmit the asynchronous packets, as that shown in a transmitting timing 910. However, asynchronous packets P1 and P2 in the asynchronous queue 212 are still waiting to be transmitted. Now, the remaining bandwidth of the second time slot is insufficient to transmit the entire asynchronous packets P1 and P2. In this case, the scheduling module 230 activates the fragmentation module 240, and the fragmentation module 240 divides the asynchronous packets P1 and P2 into a plurality of small packets PF according to the remaining bandwidth of the second time slots of the current clock cycle and follow-up clock cycles. Then, the scheduling module 230 arranges the small packets PF into the remaining bandwidth of the second time slots of the current clock cycle and the follow-up clock cycles, as that shown in a transmitting timing 920. In this way, the usage rate of the network bandwidth is increased.

In summary, according to the aforementioned system and method for transmitting network packets, a plenty of multimedia streams can be accommodated in the limited bandwidth. The media servers of the same network can mutually exchange media information, so that they do not influence each other's respective transmission QoS. According to the packet fragmentation mechanism, the packets can be arranged into the remaining bandwidth, so that the usage rate of the network bandwidth is increased, and the QoS is guaranteed.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A system for transmitting network packets, comprising:
   an information module, receiving and recording media information of a plurality of multimedia streams provided by a first media server and a second media server, wherein the media information comprises a frame rate and a frame size of each of the multimedia streams;
   a scheduling module, calculating a guaranteed bit rate of each of the multimedia streams according to the frame rate and the frame size, rearranging isochronous packets of the multimedia streams in first time slots of a plurality of clock cycles according to the guaranteed bit rates so that the transmission of the isochronous packets satisfies the guaranteed bit rates of all of the multimedia streams, determining a transmitting sequence of the isochronous packets in each of the clock cycles according to the guaranteed bit rate of each of the multimedia streams such that each of the clock cycles includes the isochronous packets provided by both of the first media server and the second media server, and using a linked list to link the isochronous packets provided by the first media server in each of the clock cycles according to the transmitting sequence, wherein a length of each of the clock cycles is a predetermined length, a length of the first time slot and the predetermined length are in a predetermined ratio; and
   a forwarding module, transmitting all the packets of a current one of the clock cycles provided by the first media server to a network according to the transmitting sequence at every a time interval of the predetermined length, wherein the isochronous packets provided by the first media server transmitted in each even one of the clock cycles are more than the isochronous packets provided by the first media server transmitted in each odd one of the clock cycles, and the isochronous packets provided by the second media server transmitted in each odd one of the clock cycles are more than the isochronous packets provided by the second media server transmitted in each even one of the clock cycles.

2. The system for transmitting network packets as claimed in claim 1, further comprising:
a synchronization module, synchronizing the media information of all of the multimedia streams in the network, wherein the scheduling module rearranges the isochronous packets in the first time slots of the clock cycles according to the media information of all of the multimedia streams in the network.

3. The system for transmitting network packets as claimed in claim 1, further comprising:
a classification module, storing a plurality of isochronous queues, wherein each of the isochronous queues corresponds to one of the multimedia streams, and the classification module stores each of the isochronous packets provided by the first media server into one of the isochronous queues according to the media information provided by the information module.

4. The system for transmitting network packets as claimed in claim 3, wherein the media information of each of the multimedia streams comprises a session ID, each of the isochronous packets comprises the session ID of the corresponding multimedia stream, and the classification module allocates the isochronous queues according to the session IDs provided by the information module, and further stores each of the isochronous packets provided by the first media server into the corresponding isochronous queue of the corresponding multimedia stream according to the session ID of the particular isochronous packet.

5. The system for transmitting network packets as claimed in claim 3, wherein each of the isochronous queues is a linked list.

6. The system for transmitting network packets as claimed in claim 3, further comprising:
a fragmentation module, wherein when an isochronous packet is waiting to be transmitted in a clock cycle while a bandwidth of the first time slot of the clock cycle is insufficient, the scheduling module activates the fragmentation module, and the fragmentation module divides the isochronous packet into a plurality of small packets according to remaining bandwidth of the first time slots of the clock cycle and follow-up clock cycles, and then the scheduling module arranges the small packets into the remaining bandwidth of the first time slots of the clock cycle and the follow-up clock cycles.

7. The system for transmitting network packets as claimed in claim 3, wherein the classification module further stores an asynchronous queue, and the classification module stores received asynchronous packets into the asynchronous queue.

8. The system for transmitting network packets as claimed in claim 7, wherein each of the clock cycles comprises the first time slot and a second time slot, and the forwarding module uses the first time slot to transmit the isochronous packets of a current clock cycle, and uses the second time slot to transmit the asynchronous packets in the asynchronous queue.

9. The system for transmitting network packets as claimed in claim 7, wherein when there is no isochronous packet to be transmitted in a clock cycle, or when transmission of the isochronous packets of the clock cycle has been completed before the first time slot ends, the forwarding module switches immediately to transmit the asynchronous packets in the asynchronous queue.

10. The system for transmitting network packets as claimed in claim 7, further comprising:
a fragmentation module, wherein when an asynchronous packet is waiting to be transmitted in a clock cycle while a bandwidth of a second time slot of the clock cycle is insufficient, the scheduling module activates the fragmentation module, and the fragmentation module divides the asynchronous packet into a plurality of small packets according to remaining bandwidth of the second time slots of the clock cycle and follow-up clock cycles, and then the scheduling module arranges the small packets into the remaining bandwidth of the second time slots of the clock cycle and the follow-up clock cycles.

11. A method for transmitting network packets, performed by a first media server, comprising:
receiving and recording media information of a plurality of multimedia streams provided by the first media server and a second media server, wherein the media information comprises a frame rate and a frame size of each of the multimedia streams;
calculating a guaranteed bit rate of each of the multimedia streams according to the frame rate and the frame size;
rearranging isochronous packets of the multimedia streams in first time slots of a plurality of clock cycles according to the guaranteed bit rates, so that transmission of the isochronous packets satisfies the guaranteed bit rates of all of the multimedia streams, wherein a length of each of the clock cycles is a predetermined length, and a length of the first time slot and the predetermined length are in a predetermined ratio;
determining a transmitting sequence of the isochronous packets in each of the clock cycles according to the guaranteed bit rate of each of the multimedia streams such that each of the clock cycles includes the isochronous packets provided by both of the first media server and the second media server;
using a linked list to link the isochronous packets provided by the first media server in each of the clock cycles according to the transmitting sequence; and
transmitting all the packets of a current one of the clock cycles provided by the first media server to a network according to the transmitting sequence at every a time interval of the predetermined length, wherein the isochronous packets provided by the first media server transmitted in each even one of the clock cycles are more than the isochronous packets provided by the first media server transmitted in each odd one of the clock cycles, and the isochronous packets provided by the second media server transmitted in each odd one of the clock cycles are more than the isochronous packets provided by the second media server transmitted in each even one of the clock cycles.

12. The method for transmitting network packets as claimed in claim 11, further comprising:
synchronizing the media information of all of the multimedia streams in the network; and
rearranging the isochronous packets in the first time slots of the clock cycles according to the media information of all of the multimedia streams in the network.

13. The method for transmitting network packets as claimed in claim 11, further comprising:
storing a plurality of isochronous queues, wherein each of the isochronous queues corresponds to one of the multimedia streams; and
storing each of the isochronous packets provided by the first media server into one of the isochronous queues according to the media information.

14. The method for transmitting network packets as claimed in claim 13, wherein the media information of each of the multimedia streams comprises a session ID, each of the isochronous packets comprises the session ID of the corresponding multimedia stream, and the method for transmitting network packets further comprises:

allocating the isochronous queues according to the session IDs; and     storing each of the isochronous packet provided by the first media server into the corresponding isochronous queue of the corresponding multimedia stream according to the session ID of the particular isochronous packet.

15. The method for transmitting network packets as claimed in claim 13, wherein each of the isochronous queues is a linked list.

16. The method for transmitting network packets as claimed in claim 13, further comprising:

dividing an isochronous packet into a plurality of small packets according to remaining bandwidth of the first time slots of a clock cycle and follow-up clock cycles when the isochronous packet is waiting to be transmitted in the clock cycle while a bandwidth of the first time slot of the clock cycle is insufficient; and     arranging the small packets into the remaining bandwidth of the first time slots of the clock cycle and the follow-up clock cycles.

17. The method for transmitting network packets as claimed in claim 13, further comprising:

storing an asynchronous queue; and storing received asynchronous packets into the asynchronous queue.

18. The method for transmitting network packets as claimed in claim 17, wherein each of the clock cycles comprises the first time slot and a second time slot, and the method for transmitting network packets further comprises:

using the first time slot to transmit the isochronous packets of the current clock cycle; and     using the second time slot to transmit the asynchronous packets in the asynchronous queue.

19. The method for transmitting network packets as claimed in claim 17, further comprising:

immediately switching to transmit the asynchronous packets in the asynchronous queue when there is no isochronous packet to be transmitted in a clock cycle, or when transmission of the isochronous packets of the clock cycle has been completed before the first time slot ends.

20. The method for transmitting network packets as claimed in claim 17, further comprising:

dividing an asynchronous packet into a plurality of small packets according to remaining bandwidth of second time slots of a clock cycle and follow-up clock cycles when the asynchronous packet is waiting to be transmitted in the clock cycle while a bandwidth of the second time slot of the clock cycle is insufficient; and     arranging the small packets into the remaining bandwidth of the second time slots of the clock cycle and the follow-up clock cycles.

21. A system for transmitting network packets, comprising:

an information module, receiving and recording media information of a plurality of multimedia streams provided by a first media server and a second media server;

a scheduling module, calculating a guaranteed bit rate of each of the multimedia streams according to the media information provided by the information module, and rearranging isochronous packets of the multimedia streams in first time slots of a plurality of clock cycles according to the guaranteed bit rates, so that the transmission of the isochronous packets satisfies the guaranteed bit rates of all of the multimedia streams, wherein a length of each clock cycle is a predetermined length, and a length of the first time slot and the predetermined length are in a predetermined ratio;

a forwarding module, transmitting all the packets of a current one of the clock cycles provided by the first media server to a network at every a time interval of the predetermined length, wherein the isochronous packets provided by the first media server transmitted in each even one of the clock cycles are more than the isochronous packets provided by the first media server transmitted in each odd one of the clock cycles, and the isochronous packets provided by the second media server transmitted in each odd one of the clock cycles are more than the isochronous packets provided by the second media server transmitted in each even one of the clock cycles; and     a fragmentation module, wherein when an isochronous packet is waiting to be transmitted in a clock cycle while a bandwidth of the first time slot of the clock cycle is insufficient, the scheduling module activates the fragmentation module, and the fragmentation module divides the isochronous packet into a plurality of small packets according to remaining bandwidth of the first time slots of the clock cycle and follow-up clock cycles, and then the scheduling module arranges the small packets into the remaining bandwidth of the first time slots of the clock cycle and the follow-up clock cycles, wherein when an asynchronous packet is waiting to be transmitted in a clock cycle while a bandwidth of a second time slot of the clock cycle is insufficient, the scheduling module activates the fragmentation module, and the fragmentation module divides the asynchronous packet into a plurality of small packets according to remaining bandwidth of the second time slots of the clock cycle and follow-up clock cycles, and then the scheduling module arranges the small packets into the remaining bandwidth of the second time slots of the clock cycle and the follow-up clock cycles.

22. A method for transmitting network packets, performed by a first media server, comprising:

receiving and recording media information of a plurality of multimedia streams provided by the first media server and a second media server;

calculating a guaranteed bit rate of each of the multimedia streams according to the media information;

rearranging isochronous packets of the multimedia streams in first time slots of a plurality of clock cycles according to the guaranteed bit rates, so that transmission of the isochronous packets satisfies the guaranteed bit rates of all of the multimedia streams, wherein a length of each of the clock cycles is a predetermined length, and a length of the first time slot and the predetermined length are in a predetermined ratio;

transmitting all the packets of a current one of the clock cycles provided by the first media server to a network at every a time interval of the predetermined length, wherein the isochronous packets provided by the first media server transmitted in each even one of the clock cycles are more than the isochronous packets provided by the first media server transmitted in each odd one of the clock cycles, and the isochronous packets provided by the second media server transmitted in each odd one of the clock cycles are more than the isochronous packets provided by the second media server transmitted in each even one of the clock cycles;

dividing an isochronous packet into a plurality of first small packets according to remaining bandwidth of the first time slots of a clock cycle and follow-up clock cycles when the isochronous packet is waiting to be transmitted in the clock cycle while a bandwidth of the first time slot of the clock cycle is insufficient;

arranging the first small packets into the remaining bandwidth of the first time slots of the clock cycle and the follow-up clock cycles;

dividing an asynchronous packet into a plurality of second small packets according to remaining bandwidth of second time slots of a clock cycle and follow-up clock cycles when the asynchronous packet is waiting to be transmitted in the clock cycle while a bandwidth of the second time slot of the clock cycle is insufficient; and arranging the second small packets into the remaining bandwidth of the second time slots of the clock cycle and the follow-up clock cycles.

\* \* \* \* \*